United States Patent

[11] 3,585,503

[72] Inventor Otto E. Rittenbach
Neptune, N.J.
[21] Appl. No. 872,969
[22] Filed Oct. 31, 1969
[45] Patented June 15, 1971
[73] Assignee The United States of America as represented by the Secretary of the Army

[54] BINARY PSK TRANSMISSION USING TWO CLOSELY RELATED FREQUENCIES TO ELIMINATE PHASE DISCONTINUITY
6 Claims, 2 Drawing Figs.

[52] U.S. Cl. .......... 325/163, 178/66, 178/67
[51] Int. Cl. .......... H04l 27/20
[50] Field of Search .......... 325/30, 163; 178/66, 67

[56] References Cited
UNITED STATES PATENTS

| | | | |
|---|---|---|---|
| 3,102,238 | 8/1963 | Bosen .......... | 325/163 |
| 3,190,958 | 6/1965 | Bullwinkel et al. .......... | 325/30 |
| 3,205,441 | 9/1965 | Likel .......... | 325/163 |
| 3,417,332 | 12/1968 | Webb .......... | 325/163 |

*Primary Examiner*—Robert L. Griffin
*Assistant Examiner*—James A. Brodsky
*Attorneys*—Harry M. Saragovitz, Edward J. Kelly, Herbert Berl and Jeremiah G. Murray

ABSTRACT: The binary transmission system includes an oscillator for generating an RF signal at a first frequency and a binary information generator for generating information at a second frequency under the control of a clock operating at the second frequency. The clock signal frequency is divided in half by a flip-flop and balanced modulated with the oscillator RF signal, and then fed to a band-pass filter tuned to one of the side bands to establish a third frequency. The difference between the first and third frequencies is one-half the clock rate. A pair of phase splitters provide phase-reversed outputs of the signals at the first and third frequencies. A logic circuit controlled by the binary information generator selectively switches these phase-reversed signals to an antenna for transmission. Switching is accomplished such that the phase of the successively applied signals are phase matched at the time of switching.

INVENTOR.
OTTO E. RITTENBACH

BY Jeremiah G. Murray AGENT
Harry M. Saragovitz
Edward J. Kelly
Herbert Berl
ATTORNEYS

INVENTOR.
OTTO E. RITTENBACH
BY
AGENT
ATTORNEY

BINARY PSK TRANSMISSION USING TWO CLOSELY RELATED FREQUENCIES TO ELIMINATE PHASE DISCONTINUITY

The invention described herein may be manufactured, used, and licensed by or for the Government for governmental purposes without the payment to me of any royalty thereon.

The present invention relates to communication systems and more particularly to a binary transmission system which transmits a phase-reversed carrier signal.

In the field of communications, phase reversal of a carrier signal in accordance with some binary signal has been accomplished simply by balanced modulation. Theoretically, if infinite bandwidth were available, the ideal system would produce an instantaneous phase inversion of the RF signal. However, in the practical system, a finite time is required to effect the phase reversal and the transient signal generated during this time period will determine the number of harmonics produced and therefore the bandwidth.

It is, therefore, the primary object of this invention to provide a simple, narrow-band, phase-modulated communications system.

The exact nature of this invention as well as other objects and advantages thereof will be readily apparent from consideration of the following specification relating to the annexed drawing in which.

Figure 1:
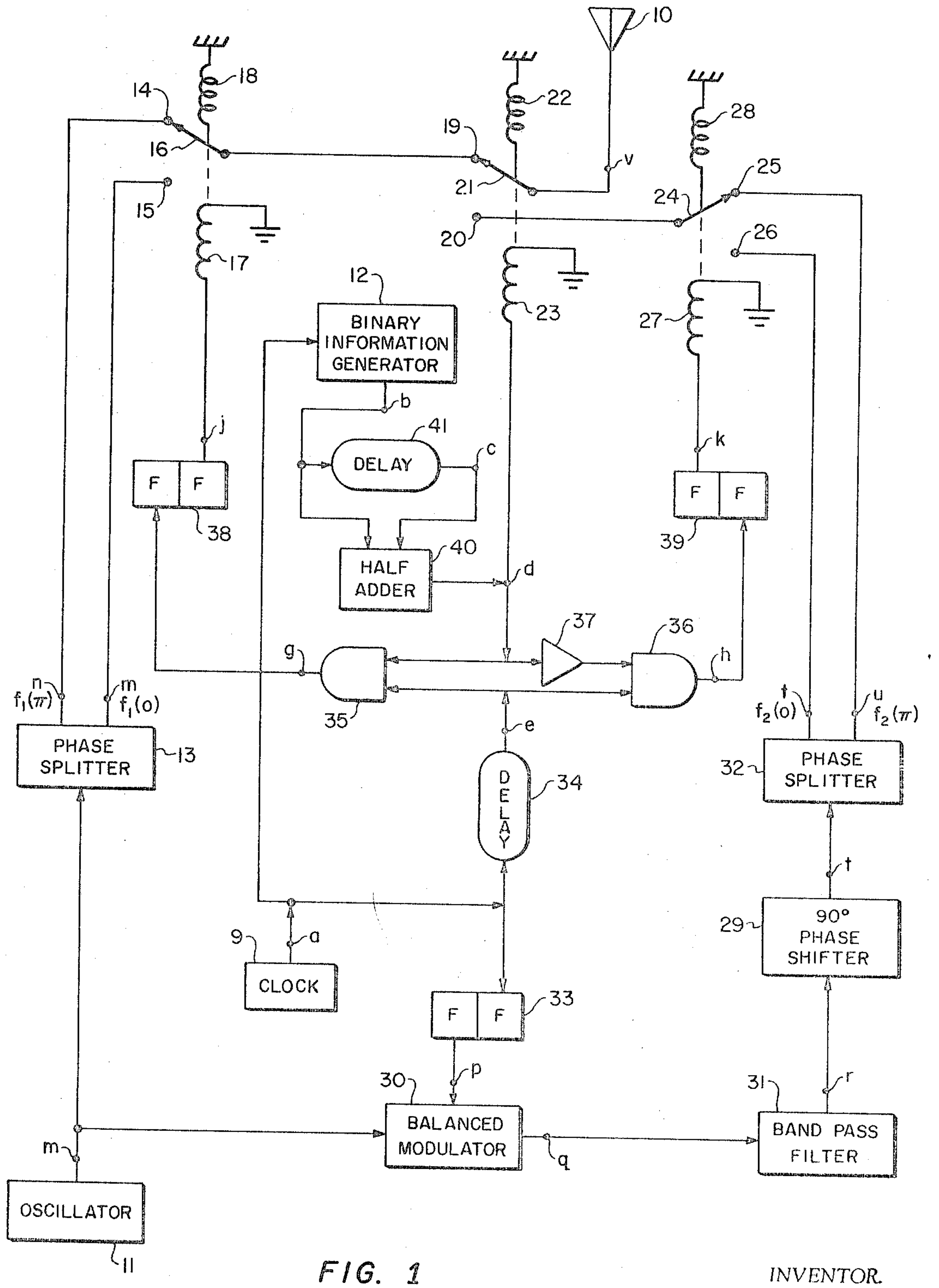
FIG. 1 shows a block diagram of a preferred embodiment of the invention.

Referring now to the drawing there is shown in FIG. 1 a transmitter having an antenna 10 for radiating an RF signal which is initially derived from a highly stable oscillator 11. The binary information to be transmitted by the RF signal is generated by the binary information generator 12 in any well-known fashion under the control of a clock 9. The output of oscillator 11 is connected to a phase splitter 13 having complementary phase outputs $f_1(0)$ and $f_1(\pi)$ which are separated in phase by 180°. The outputs $f_1(0)$ and $f_1(\pi)$ are connected to contacts 15 and 14 respectively of a relay having an armature 16 and relay coil 17. A spring 18 biases the armature 16 into contact with contact 14. Armature 16 is connected to contact 19 of a relay having a second contact 20, an armature 21 biased by spring 22 into contact with contact 19 and a coil 23. The armature 21 is connected to the antenna 10. Contact 20 is connected to the armature 24 of a third relay having contacts 25 and 26, and coil 27. A spring 28 biases armature 24 into engagement with contact 25, as shown in FIG. 1. The three relays are illustrated as electromechanical relays for convenience only and faster acting electronic switches would in most cases be more desirable.

Oscillator 11 is also connected to the input of a balanced modulator 30 the output of which is connected to a band-pass filter 31 which in turn is connected via phase shifter 29 to phase splitter 32 having phase-opposed outputs $f_2(0)$ and $f_2(\pi)$ connected to contacts 26 and 25 respectively. Also connected to modulator 30 is the output of flip-flop 33, the input of which is connected to the output of clock 9. Clock 9 is also connected via delay 34 to one of the inputs of two input AND gates 35 and 36. The output of a half adder 40 is connected directly to coil 23, the other input of AND gate 35, and via inverter 37 to the other input of AND gate 36. The output of generator 12 is connected both directly and through a delay 41 to half adder 40. A flip-flop 38 has the input thereof connected to the output of AND gate 35 and the output thereof connected to coil 17. A flip-flop 39 has the input thereof connected to the output of AND gate 36 and the output thereof connected to coil 27.

Figure 2:
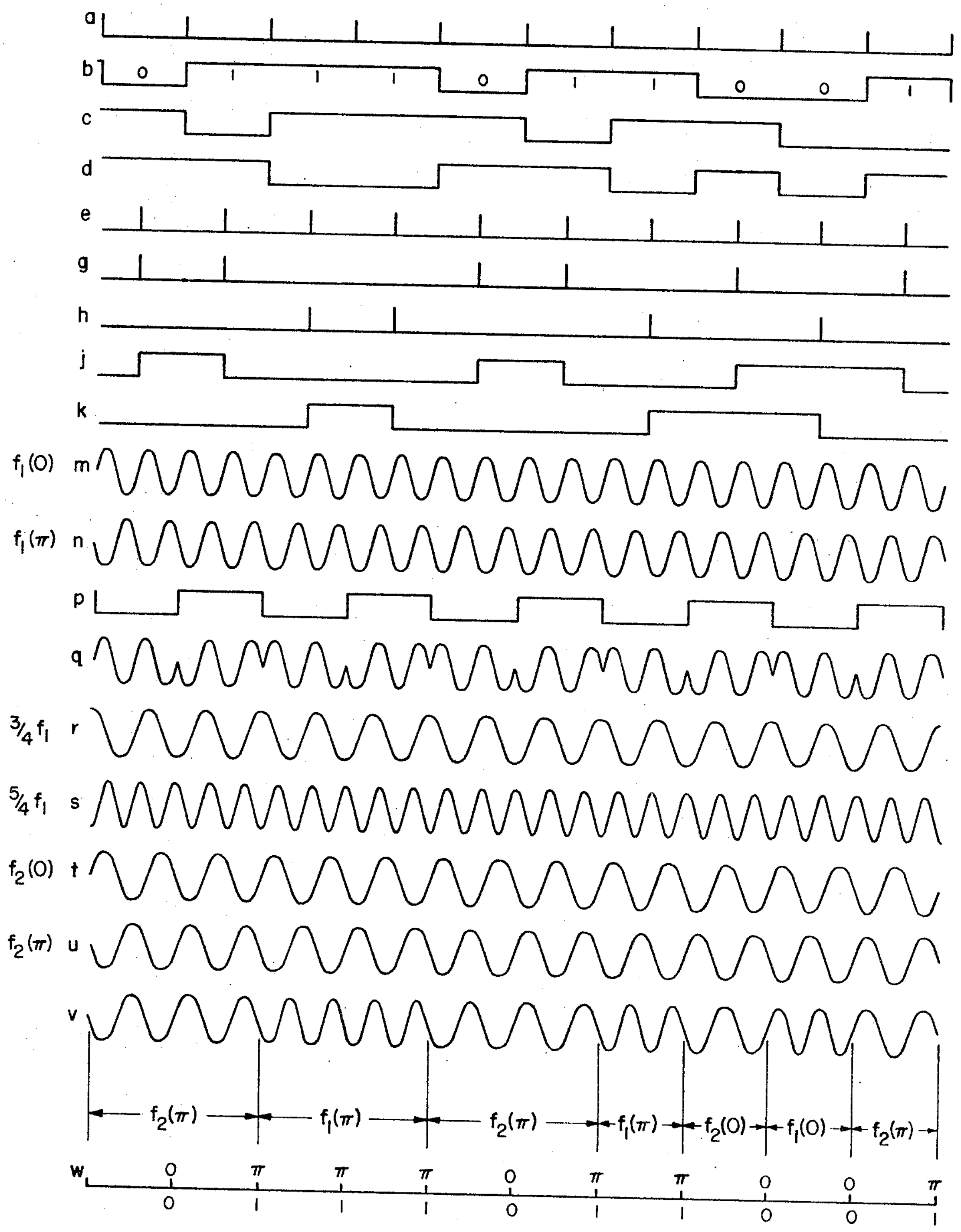
FIG. 2 shows waveforms useful in understanding the operation of the device of FIG. 1.

With particular reference to FIG. 2 the operation of the device of FIG. 1 will now be described. Signal *a* represents the output of clock 9 and signal *b* represents the output of generator 12. Signal *b* contains the information to be transmitted, i.e. 0111011001 and is a square wave generated under the timing of clock 9, signal *a*. Delay 41 introduces a delay equal to one time period of clock 9 and therefore has an output which is represented by signal *c* which is a delayed version of *b*. The half adder 40 produces an output whenever either one of the inputs is positive and the other input is zero. Such functions are sometimes referred to as the EXCLUSIVE-OR function. Half adder 40 which has inputs *b* and *c* will therefore have signal *d* as an output. The combined effect of both the delay 41 and half adder 40 is to produce a square wave signal *d* which has a square pulse of one clock period following every transition in the information signal *b*. The output *d* of half adder 40 is connected to coil 23 and therefore controls armature 21 which is biased by spring 22 into contact with contact 19. When signal *d* goes positive, armature 21 is attracted to coil 23 and moved into contact with contact 20. The output *d* of half adder 40 is also gated with a signal *e* which is the clock 9 output *a* delayed one half the clock period by delay 34. Therefore, the outputs of AND gates 35 and 36 will be *g* and *h* respectively. Signals *g* and *h* are applied to flip-flops 38 and 39, thereby producing outputs *j* and *k* respectively. Signal *j* controls armature 16 via coil 17 and *k* controls armature 24 via coil 27. Therefore, signals *d*, *j*, and *k* will determine the positions of the armatures 16, 21, and 24 and therefore determine which of the signals $f_1(0)$, or $f_1(\pi)$, or $f_2(0)$, or $f_2(\pi)$ is being transmitted by antenna 10.

Signal *m* represents the RF signal $f_1$ generated by oscillator 11. For example only, the frequency of signal *m* is chosen to be twice the clock rate. Signal *m* when applied to phase splitter 13 is split into two phase opposed signals $f_1(0)$ and $f_1(\pi)$ represented by signals *m* and *n* respectively. Signal *m* is also applied to balanced modulator 30 where it is balanced modulated with signal *p* of flip-flop 33 which is pulsed by clock 9, signal *a*. The output of modulator 30 is represented by signal *q* which is simply signal $f_1$ periodically phase reversed at the clock rate. Signal *q* is predominantly composed of the sum and difference sidebands. Therefore, since signal *m* is at $f_1$ and signal *p* is $1/4\,f_1$, then signal *q* will be predominantly made of signals *r* and *s* which are $3/4\,f_1$ and $5/4\,f_1$ respectively. Band-pass filter 31 is tuned to $3/4\,f_1$, signal *r*, thereby eliminating signal *s* and all of the other higher harmonics. Phase shifter 29 shifts the phase of signal *r* 90° to produce signal *t* which is now designated as having frequency $f_2$ which in this example is equal to $3/4\,f_1$ as just explained. Signal *t* is applied to phase splitter 32 to produce phase-opposed signals *t* and *u* at $f_2(0)$ and $f_2(\pi)$. It is pointed out at this point that one of the important features of signals $f_1(0)$, $f_1(\pi)$, $f_2(0)$, and $f_2(\pi)$ be that; $f_1(0)$ should be at zero phase with respect to some reference each time a clock pulse is generated, $f_1(\pi)$ should be in phase opposition with respect to $f_1(0)$, $f_2(0)$ should alternate between zero and $\pi$ phase with respect to $f_1(0)$ each time a clock pulse is generated, and $f_2(\pi)$ should be in phase opposition with respect to $f_2(0)$. This will be true if the difference between $f_1$ and $f_2$ is an odd multiple of one-half the clock rate.

Therefore, in accordance with the relay control signals *d*, *h*, and *k* either one of the signals *m*, *n*, *t*, or *u* will be transmitted by antenna 10. For example, in FIG. 2 signal *d* is positive for the first two clock periods, thereby placing the armature 21 into contact with contact 20. Since signal *k* is zero for the first two periods of signal *a*, then armature 24 will be in contact with contact 25 and signal *u* $f_2(\pi)$ will be transmitted for the first two periods. Signal *d* then goes to zero for the next two periods, thereby returning armature 21 into contact with contact 19. Since signal *j* is zero for this time, armature 16 will be in contact with contact 14 and signal $f_1(\pi)$ will be transmitted. It is pointed out that at the time the transmitted signal is changed from $f_2(\pi)$ to $f_1(\pi)$ the signals *u* and *n* are in phase with respect to each other. The next two cycles, i.e. fifth and sixth, shown in FIG. 2 are a repeat of the first two and $f_2(\pi)$ is therefore transmitted by antenna 10. Here again the signals *u* and *n* are at the same phase when the transmitted signal switches from $f_1(\pi)$ to $f_2(\pi)$. During the seventh clock cycle, $f_1(\pi)$ is transmitted in accordance with signals *d*, *j* and *k*, and therefore the positions of armatures 16, 21 and 24. Further analysis will show that signals $f_2(0)$, $f_1(0)$, and $f_2(\pi)$ are then transmitted during the eighth, ninth, and 10 cycles respectively. The phase of the transmitted signal *v* at the time of the clock pulses *a* will therefore be determined by the information signal *b* generated by generator 12. A receiver, operating in synchronism with the clock 9, could detect the phase of the signal *v* at the clock pulse time. Line *w* in FIG. 2, shows, on top, the phase of the signal *v* at the time of the clock pulses *a* and, on the bottom, shows the binary information represented thereby.

It may now be appreciated that the signal *v* is made up of two signals $f_1$ and $f_2$ having frequencies which are relatively close (they differ by only half a cycle) and when transmitted are "smoothly" connected successively. Therefore, the amount of energy in signal *v* will be predominantly contained in an extremely narrow band. Obviously many modifications and variations of the present invention are possible in the light of the above teachings.

What I claim is:

1. A binary communications system for transmitting a signal which is periodically of equal phase and of opposed phase with respect to a reference signal comprising; an information generator means for generating binary information; first signal generator means for generating a relatively narrow-band signal at a first frequency; a second signal generator means for generating a relatively narrow-band signal at a second frequency which differs from said first frequency by an odd multiple of one-half the bit rate of said information generator means; means connected to said first and second signal generator means having four output terminal means for providing phase-opposed signals on said terminal means at said first and second frequencies; signal transmission means; switching means connected between said four output terminal means and said signal transmission means for connecting any one of said four output terminal means to said signal transmission means; and means connected to said information generator means and said switching means for selectively switching the connection of said signal transmission means between two said output terminals having signals of different frequencies and of the same phase such that the signal on said transmission means, in accordance with said binary information, is either in phase or of opposed phase with respect to said signal of said first signal generator means.

2. The device according to claim 1 and further including frequency divider means connected to said information generator means for generating a signal equal to an odd multiple of one-half said bit rate; and said second signal generator means including a modulator means connected to said frequency divider means and said first signal generator means, and a filter means connected to said modulator means for passing said signal at said second frequency.

3. The device according to claim 2 and wherein said frequency divider means is a flip-flop.

4. The device according to claim 3 and wherein said modulator means is a balanced modulator.

5. A binary communications system for transmitting a signal which is periodically of equal phase and of opposed phase with respect to a reference signal comprising; a clock means for generating a series of clock pulses at a clock rate; an oscillator means for generating a relatively narrow-band signal at a first RF frequency; first phase splitter means connected to the oscillator means for generating a pair of phase-opposed outputs at said first RF frequency; a flip-flop means connected to said clock means for generating a signal at half said clock rate; balanced modulator means connected to said oscillator means and said flip-flop means for modulating said oscillator signal with said flip-flop signal; band-pass filter means connected to said modulator means and tuned to one of the sidebands produced by said modulator means for passing a signal at a second RF frequency; second phase splitter means connected to said filter means for generating a pair of phase-opposed outputs at said second RF frequency; antenna means for transmitting said signals at said first and second RF frequencies; switch means for connecting said antenna means to one of said phase opposed outputs; binary information generator means; and switch control means connected to said binary information generator means and said switching means for selectively switching the connection of said signal transmission means between two said phase-opposed outputs having different frequencies and of the same phase such that the signal on said transmission means, in accordance with said binary information, is either in phase or of opposed phase with respect to said signal at said first RF frequency.

6. The device according to claim 5 and wherein said switch control means includes means connected to said binary information generator means for generating a binary logic signal having a bit rate equal to said clock rate and having one pulse after each transition of said information signal; and logic means connected to said last-mentioned means and said clock means for controlling said switch means.